(12) United States Patent
Yang et al.

(10) Patent No.: US 11,005,537 B2
(45) Date of Patent: May 11, 2021

(54) SIGNAL SENDING METHOD AND APPARATUS

(71) Applicant: HUAWEI TECHNOLOGIES CO., LTD., Guangdong (CN)

(72) Inventors: Bo Yang, Nanjing (CN); Wei Gu, Nanjing (CN); Fangchao Yuan, Nanjing (CN); Peng Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/823,859

(22) Filed: Mar. 19, 2020

(65) Prior Publication Data

US 2020/0220579 A1 Jul. 9, 2020

Related U.S. Application Data (63) Continuation of application No. PCT/CN2019/093054, filed on Jun. 26, 2019.

(30) Foreign Application Priority Data

Jun. 28, 2018 (CN) .......................... 201810687914.8

(51) Int. Cl.
*H04B 7/024* (2017.01)
(52) U.S. Cl.
CPC .................................... *H04B 7/024* (2013.01)
(58) Field of Classification Search
CPC .... H04B 7/0417; H04B 1/7105; H04B 7/024; H04L 1/0026
See application file for complete search history.

(56) References Cited

U.S. PATENT DOCUMENTS

| | | | |
|---|---|---|---|
| 2008/0005219 | A1 | 1/2008 | Nabar et al. |
| 2013/0089123 | A1 | 4/2013 | Rahul et al. |
| 2014/0056205 | A1 | 2/2014 | Aboul-Magd et al. |
| 2015/0131751 | A1* | 5/2015 | Bayesteh ............. H04B 7/0482 375/267 |

(Continued)

FOREIGN PATENT DOCUMENTS

| | | |
|---|---|---|
| CN | 101304399 A | 11/2008 |
| CN | 101335556 A | 12/2008 |

(Continued)

OTHER PUBLICATIONS

Rahul et al., "JMB scaling wireless capacity with user demands", Proceedings of the ACM SIGCOMM 2012 conference on Applications, technologies, architectures, and protocols for computer communication. ACM, 2012, 12 pages.

(Continued)

*Primary Examiner* — Sung S Ahn
(74) *Attorney, Agent, or Firm* — Fish & Richardson P.C.

(57) ABSTRACT

The present disclosure relates to signal sending methods and apparatus. One example method includes generating a first data signal based on channel state information, receiving a second data signal sent by a primary transmitter, determining a phase of the second data signal, and sending the first data signal based on a phase of a first measurement signal sent by the primary transmitter and the phase of the second data signal sent by the primary transmitter.

13 Claims, 3 Drawing Sheets

(56) References Cited

U.S. PATENT DOCUMENTS

2015/0288427 A1* 10/2015 Wang ............... H04W 72/1273
370/329
2017/0135053 A1 5/2017 Shenoi et al.
2018/0091272 A1 3/2018 Wang et al.
2018/0146506 A1 5/2018 Zhang et al.

FOREIGN PATENT DOCUMENTS

| CN | 101478511 A | 7/2009 |
| CN | 103988449 A | 8/2014 |
| CN | 104604325 A | 5/2015 |
| CN | 106357583 A | 1/2017 |

OTHER PUBLICATIONS

PCT International Search Report and Written Opinion in International Application No. PCT/CN2019/093,054, dated Sep. 24, 2019, 11 pages (With Partial English Translation).
Office Action issued in Chinese Application No. 201810687914.8 dated Apr. 24, 2020, 9 pages (With English Translation).
Extended European Search Report issued in European Application No. 19827422.7 dated Nov. 5, 2020, 7 pages.

* cited by examiner

SIGNAL SENDING METHOD AND APPARATUS

CROSS-REFERENCE TO RELATED APPLICATIONS

This application is a continuation of International Application No. PCT/CN2019/093054, filed on Jun. 26, 2019, which claims priority to Chinese Patent Application No. 201810687914.8, filed on Jun. 28, 2018. The disclosures of the aforementioned applications are hereby incorporated by reference in their entireties.

TECHNICAL FIELD

This application relates to the field of communications technologies, and in particular, to a signal sending method and an apparatus.

BACKGROUND

A multiple-input multiple-output (MIMO)) technology has gradually become a mainstream signal transmission technology in a wireless communications system. The MIMO technology means that a transmitter includes a plurality of antennas. During signal sending, a transmitter may send signals to a plurality of receivers at a same time and at a same frequency. In addition, considering a problem of signal interference, a distance between each two adjacent antennas of the plurality of antennas of the transmitter needs to be greater than a specific value. Based on this, because a device size of the transmitter is limited, a quantity of antennas included in the transmitter is limited. In other words, when a signal is sent by using the MIMO technology, signal transmission efficiency is limited by the device size of the transmitter. Based on this, to further improve the signal transmission efficiency, a distributed MIMO technology is proposed. The distributed MIMO technology refers to coordinating a plurality of transmitters that are spatially independent of each other, to send signals to a plurality of receivers at a same time and at a same frequency, where each of the plurality of transmitters has an independent radio frequency link, and each transmitter may include a plurality of antennas. In this way, when a signal is sent, the data transmission efficiency can be further improved by deploying more independent transmitters, and it can be ensured that the device size of each transmitter does not need to be excessively large or complicated.

In the prior art, when the distributed MIMO technology is used to send a signal, each of the plurality of transmitters that are spatially independent of each other sends a signal by using a clock generated by a local crystal oscillator. In this case, none of frequencies and time of the transmitters is synchronous; a secondary transmitter in the plurality of transmitters may adjust a phase of a to-be-sent second data signal by measuring a phase of a first data signal sent by a primary transmitter, to implement time synchronization between the primary transmitter and the secondary transmitter.

However, in the prior art, if a signal-to-noise ratio of a first data signal received by a secondary transmitter is comparatively low, a comparatively large measurement error exists in a measured phase of the first data signal. In this case, if a phase of a second data signal is adjusted directly by using the phase of the first data signal, a comparatively large error may also exist in an adjusted phase of the second data signal. In this way, not only time synchronization between the secondary transmitter and a primary transmitter cannot be implemented, but also a larger time offset may be caused, leading to signal interference between the primary transmitter and the secondary transmitter.

SUMMARY

Embodiments of this application provide a signal sending method and an apparatus, to resolve a problem in a related technology that signal interference exists between transmitters caused by asynchronous time when a plurality of transmitters perform joint transmission.

According to a first aspect, a signal sending method is provided, where the method includes:

generating a first data signal based on channel state information, where the channel state information is used to represent a characteristic of a channel between a primary transmitter and a receiver and a characteristic of a channel between a secondary transmitter and the receiver;

receiving a second data signal sent by the primary transmitter, and determining a phase of the second data signal; and sending the first data signal based on a phase of a first measurement signal sent by the primary transmitter and the phase of the second data signal sent by the primary transmitter.

According to the signal sending method provided in this embodiment of this application, a delay difference between a detection delay of the second data signal and a detection delay of the first measurement signal may be obtained by using the phase of the second data signal sent by the primary transmitter and the phase of the first measurement signal sent by the primary transmitter during channel measurement. Based on this, the detection delay generated in a process of joint transmission by the primary transmitter and the secondary transmitter may be eliminated by sending the first data signal based on the phases of the two signals. Compared with a related technology in which a phase of a currently to-be-sent data signal is directly adjusted based on a phase of a data signal sent by a primary transmitter, this application has higher resistance to measurement errors by adjusting, based on the phase of the second data signal sent by the primary transmitter and the phase of the first data signal sent during channel measurement, a signal sent by the secondary transmitter.

The channel state information may be a channel matrix used to represent the characteristic of the channel between the primary transmitter and the receiver and the characteristic of the channel between the secondary transmitter and the receiver, or may be an array used to represent the characteristic of the channel between the primary transmitter and the receiver and the characteristic of the channel between the secondary transmitter and the receiver, or may be in another representation form.

Optionally, before the generating a first data signal based on channel state information, the method further includes:

receiving the first measurement signal sent by the primary transmitter, determining the phase of the first measurement signal, and sending a second measurement signal to the receiver; and receiving the channel state information determined by the receiver based on the first measurement signal and the second measurement signal.

Optionally, before the receiving the first measurement signal sent by the primary transmitter, the method further includes:

receiving a first joint-transmission notification frame sent by the primary transmitter, where the first joint-transmission notification frame carries a transmitter group identifier, and the transmitter group identifier is used to identify a transmitter group to which the primary transmitter belongs; and if the transmitter group identifier carried by the first joint-transmission notification frame is the same as a stored transmitter group identifier, after first duration elapses from a time point at which reception of the first joint-transmission notification frame ends, performing the step of receiving the first measurement signal sent by the primary transmitter.

In this embodiment of this application, the primary transmitter may instruct, by sending the first joint-transmission notification frame to the secondary transmitter, the secondary transmitter to: prepare to receive the first measurement signal after receiving the first joint-transmission notification frame, and at a time point at which arrival of a frame body of the first measurement signal is detected, complete channel measurement together with the primary transmitter by sending the second measurement signal.

Optionally, before the receiving a second data signal sent by the primary transmitter, the method further includes:

receiving a second joint-transmission notification frame sent by the primary transmitter, where the second joint-transmission notification frame carries a transmitter group identifier, and the transmitter group identifier is used to identify a transmitter group to which the primary transmitter belongs; and if the transmitter group identifier carried by the second joint-transmission notification frame is the same as a stored transmitter group identifier, after second duration elapses from a time point at which reception of the second joint-transmission notification frame ends, performing the step of receiving the second data signal sent by the primary transmitter.

In this embodiment of this application, before sending the data signal, the primary transmitter sends a second joint-transmission notification frame to the secondary transmitter, to instruct the secondary transmitter to prepare to send the data signal together with the primary transmitter.

Optionally, the sending the first data signal based on a phase of a first measurement signal sent by the primary transmitter and the phase of the second data signal sent by the primary transmitter includes:

obtaining a current signal sampling time interval;

determining a phase difference between the phase of the second data signal and the phase of the first measurement signal;

determining a quantity of time intervals based on the signal sampling time interval and the phase difference; and sending the first data signal based on the quantity of time intervals.

In this embodiment of this application, since the channel state information includes the detection delay of the first measurement signal, both the second data signal generated by the primary transmitter based on the channel state information and the first data signal generated by the secondary transmitter based on the channel state information include the detection delay of the first measurement signal. In this case, when the secondary transmitter receives the second data signal sent by the primary transmitter, only the phase of the second data signal and the phase of the first measurement signal need to be compared, to obtain the delay difference between the detection delay of the second data signal and the detection delay of the first measurement signal. Since the detection delay of the first measurement signal is already included in the first data signal and the second data signal, when the first data signal is sent, only the delay difference between the detection delay of the second data signal and the detection delay of the first measurement signal needs to be compensated to eliminate an impact of the detection delays of the first data signal and the second data signal. In this way, time synchronization between the first data signal and the second data signal is implemented.

According to a second aspect, a signal sending method is provided, where the method includes:

sending a first measurement signal to a secondary transmitter, so that the secondary transmitter sends a second measurement signal based on the first measurement signal;

receiving channel state information determined by a receiver based on the first measurement signal and the second measurement signal, and generating a second data signal based on the channel state information, where the channel state information is used to represent a characteristic of a channel between a primary transmitter and the receiver and a characteristic of a channel between the secondary transmitter and the receiver; and sending the second data signal.

In this embodiment of this application, before sending the data signal, the primary transmitter may send the first measurement signal to complete channel measurement together with the secondary transmitter. Since the received channel state information sent by the receiver includes a detection delay of the first measurement signal, the second data signal generated by the primary transmitter based on the channel state information already includes the detection delay of the first measurement signal. In this case, after the primary transmitter sends the second data signal, the secondary transmitter only needs to compensate, based on a phase difference between the second data signal and the first measurement signal, a detection delay that is not included in the first data signal, to effectively eliminate a detection delay of the primary transmitter and the secondary transmitter in a process of joint transmission. In this way, time for sending signals between the primary transmitter and the secondary transmitter are synchronized.

Optionally, before the sending a first measurement signal to a secondary transmitter, the method further includes:

sending a first joint-transmission notification frame to the secondary transmitter, where the first joint-transmission notification frame carries a transmitter group identifier, and the transmitter group identifier is used to identify a transmitter group to which the primary transmitter belongs.

In this embodiment of this application, the primary transmitter may select, by sending the first joint-transmission notification frame that carries the transmitter group identifier, the secondary transmitter that performs the channel measurement together with the primary transmitter, and instruct the secondary transmitter to prepare to receive the first measurement signal.

Optionally, before the sending the second data signal, the method further includes:

sending a second joint-transmission notification frame to the secondary transmitter, where the second joint-transmission notification frame carries a transmitter group identifier, and the transmitter group identifier is used to identify a transmitter group to which the primary transmitter belongs.

In this embodiment of this application, the primary transmitter may select, by sending the second joint-transmission notification frame that carries the transmitter group identifier, the secondary transmitter that sends the data signal jointly with the primary transmitter, and instruct the secondary transmitter to prepare to receive the data signal sent by the primary transmitter. In this way, joint transmission with the primary transmitter is implemented when the data signal sent by the primary transmitter is received.

According to a third aspect, a signal sending method is provided, where the method includes:

sending, by a primary transmitter, a joint-transmission notification frame, and sending a first data signal after first duration elapses, where the joint-transmission notification frame carries a transmitter group identifier of a transmitter group to which the primary transmitter belongs; and if the secondary transmitter receives the joint-transmission notification frame and the joint-transmission notification frame carries a transmitter group identifier of a transmitter group to which the secondary transmitter belongs, sending, by a secondary transmitter, a second data signal synchronously with the primary transmitter after second duration elapses.

In this embodiment of this application, the primary transmitter may select the secondary transmitter by sending the joint-transmission notification frame. After completing the sending of the joint-transmission notification frame, the primary transmitter may send the data signal after specific duration elapses, and the secondary transmitter also sends the second data signal after specific duration elapses from the time point at which the secondary transmitter receives the joint-transmission notification frame that carries the transmitter group identifier of the transmitter group to which the secondary transmitter belongs. In this way, the joint transmission time of the primary transmitter and the secondary transmitter is aligned.

According to a fourth aspect, a signal sending apparatus is provided. The signal sending apparatus has a function of implementing the signal sending method according to the first aspect, the second aspect, or the third aspect. The signal sending apparatus includes at least one module, and the at least one module is configured to implement the signal sending method provided in the first aspect, the second aspect, or the third aspect.

According to a fifth aspect, a signal sending apparatus is provided. A structure of the signal sending apparatus includes a processor, a memory, and a transceiver. The memory is configured to store a program for supporting the signal sending apparatus in performing the signal sending method according to the first aspect, the second aspect, or the third aspect, and store related data used to implement the signal sending method provided in the first aspect, the second aspect, or the third aspect. The processor is configured to perform the program stored in the memory. The transceiver is configured to perform a signal sending and receiving operation. The signal sending apparatus may further include a communications bus, and the communications bus is configured to establish a connection between the processor, the memory, and the transceiver.

According to a sixth aspect, a computer-readable storage medium is provided. The computer-readable storage medium stores an instruction, and when the instruction is run on a computer, the computer performs the signal sending method according to the first aspect, the second aspect, or the third aspect.

According to a seventh aspect, a computer program product including an instruction is provided. When the program product is run on a computer, the computer is enabled to perform the signal sending method according to the first aspect, the second aspect, or the third aspect.

Technical effects obtained in the fourth aspect, the fifth aspect, the sixth aspect, and the seventh aspect are similar to technical effects obtained by using corresponding technical means in the first aspect, second aspect, or the third aspect. Details are not described herein again.

Beneficial effects brought by the technical solutions provided in this application include at least the following: The first data signal is generated based on channel state information, the second data signal sent by a primary transmitter is received, the phase of the second data signal is determined, and the first data signal is sent based on the phase of the first measurement signal sent by the primary transmitter and the phase of the second data signal sent by the primary transmitter. The channel state information may be used to represent the characteristic of the channel between the primary transmitter and the receiver and the characteristic of the channel between the secondary transmitter and the receiver. In the embodiments of this application, the delay difference between the detection delay of the second data signal and the detection delay of the first measurement signal may be obtained by using the phase of the second data signal sent by the primary transmitter and the phase of the first measurement signal sent by the primary transmitter during channel measurement. Based on this, the detection delay generated in a process of joint transmission by the primary transmitter and the secondary transmitter may be eliminated by sending the first data signal based on the phases of the two signals. Compared with a related technology in which a phase of a currently to-be-sent data signal is directly adjusted based on a phase of a data signal sent by a primary transmitter, this application has higher resistance to measurement errors by adjusting, based on the phase of the second data signal sent by the primary transmitter and the phase of the first data signal sent during channel measurement, a signal sent by the secondary transmitter.

DESCRIPTION OF EMBODIMENTS

To make objectives, technical solutions, and advantages of this application clearer, the following further describes implementations of this application in detail with reference to accompanying drawings.

Before the signal sending method provided in the embodiments of this application is described in detail, an implementation environment in the embodiments of this application is first described.

Figure 1:
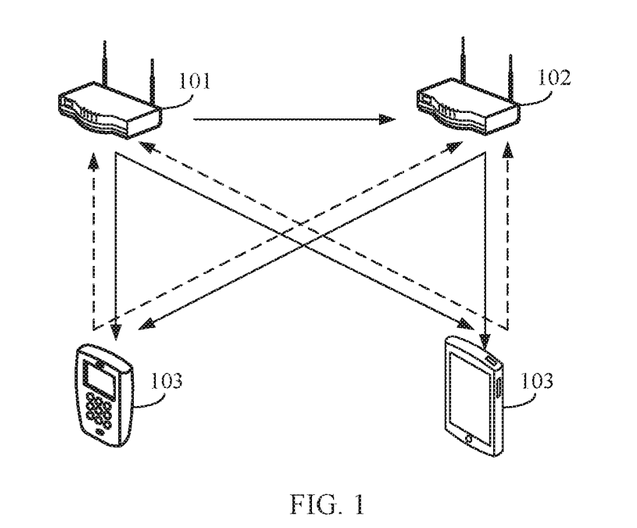
FIG. 1 is a schematic diagram of an implementation environment to which a signal sending method is applicable according to an embodiment of this application.

FIG. 1 is a schematic diagram of an implementation environment to which a signal sending method is applicable according to an embodiment of this application. As shown in FIG. 1, the implementation environment may include a primary transmitter 101, a secondary transmitter 102, and a receiver 103. The primary transmitter 101 and the secondary transmitter 102 may communicate with each other by using a wireless network. The primary transmitter 101 and the receiver 103 may communicate with each other by using the wireless network. The secondary transmitter 102 and the receiver 103 may also communicate with each other by using the wireless network.

Optionally, the signal sending method provided in this embodiment of this application may be applied to a wireless local area network (WLAN). The WLAN includes an access point station (AP) and a non-access point station (Non-AP STA). For ease of description, in the following, the access point station is referred to as an AP for short, and the non-access point station is referred to as a STA for short.

Specifically, in this embodiment of this application, the primary transmitter 101 shown in FIG. 1 may be an AP in the MILAN, the secondary transmitter 102 may also be an AP in the WLAN, and the AP serving as the primary transmitter and the AP serving as the secondary transmitter are associated with each other. That is, the primary transmitter 101 and the secondary transmitter 102 are associated with each other. Generally, an AP is also referred to as a wireless access point, a hotspot, or the like, is an access point used by a mobile subscriber to access a wired network, is mainly deployed at home, or inside a building or a campus, and has a typical coverage radius of tens to hundreds of meters. Certainly, the AP may also be deployed outdoors. The AP is equivalent to a bridge that connects a wired network and a wireless network. A main function of the AP is to connect various STAs and then connect the wireless network to the wired network. Specifically, the AP may be a network device with a wireless fidelity (Wi-Fi) chip, for example, an integrated routing and switching access device that provides an AP function or a service. Optionally, the AP may be a device that supports the 802.11ax protocol. Further, optionally, the AP may be a device that supports a plurality of WLAN standards such as 802.11ac, 802.11n, 802.11g, 802.11b, and 802.11a.

The receiver 103 known in FIG. 1 may be a STA in the WLAN. The STA may be a wireless communications chip, a wireless sensor, or a wireless communications terminal, for example, a mobile phone supporting a Wi-Fi communications function, a tablet computer supporting a Wi-Fi communications function, a set-top box supporting a Wi-Fi communications function, a smart television supporting a Wi-Fi communications function, a smart wearable device supporting a Wi-Fi communications function, a vehicle-mounted communications device supporting a Wi-Fi communications function, and a computer supporting a Wi-Fi communications function. Optionally, the station may support the 802.11ax standard. Further, optionally, the station supports a plurality of WLAN standards such as 802.11ac, 802.11n, 802.11g, 802.11b, and 802.11a.

Optionally, in this embodiment of this application, both the primary transmitter 101 and the secondary transmitter 102 may include a plurality of antennas, there may be a plurality of primary transmitters 101, and each primary transmitter 101 may be corresponding to at least one secondary transmitter 102. In addition, each primary transmitter 101 and the at least one corresponding secondary transmitter 102 form a transmitter group, to send signals to the receiver 103. Optionally, there may alternatively be a plurality of receivers 103, and the primary transmitter 101 and the at least one secondary transmitter 102 included in each transmitter group may jointly send signals to the plurality of receivers 103 at a same time point and at a same frequency by using the plurality of antennas included in each primary transmitter 101 and each secondary transmitter 102.

Figure 2:
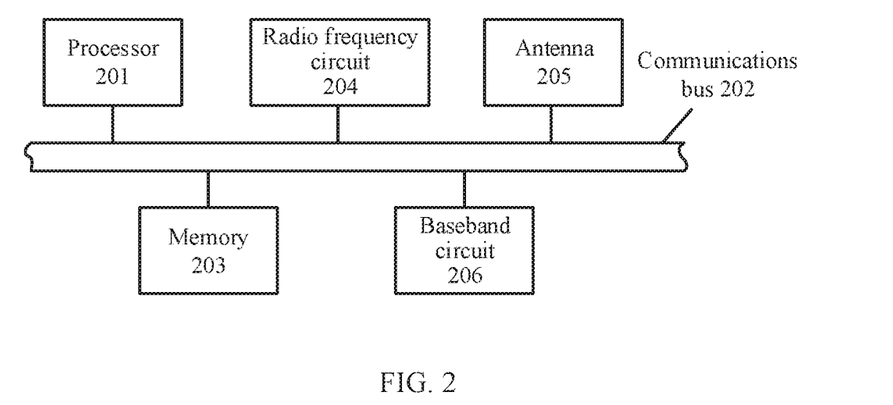
FIG. 2 is a schematic structural diagram of a network device according to an embodiment of this application.

FIG. 2 is a schematic structural diagram of a network device according to an embodiment of the present invention. For example, the primary transmitter 101, the secondary transmitter 102, and the receiver 103 in FIG. 1 all may be implemented by using the network device shown in FIG. 2. Referring to FIG. 2, the network device includes a processor 201, a communications bus 202, a memory 203, a radio frequency circuit 204, at least one antenna 205, and a baseband circuit 206.

The processor 201 may be a general-purpose central processing unit (CPU), a microprocessor, an application-specific integrated circuit (ASIC), or one or more integrated circuits configured to control program execution in the solutions of this application.

The communications bus 202 may include a channel for transmitting information between the foregoing components.

The memory 203 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that is capable of carrying or storing expected program code in a form of instructions or data structures and capable of being accessed by a computer, but is not limited thereto. The memory 203 may exist independently, and be connected to the processor 201 by using the communications bus 202. Alternatively, the memory 203 and the processor 201 may be integrated.

The radio frequency circuit 204 and the at least one antenna 205 are configured to cooperate to implement receiving and sending of a radio signal.

The baseband circuit 206 is configured to process a received radio signal or a to-be-sent radio signal.

In a specific implementation, as an embodiment, the processor 201 may include one or more CPUs.

In a specific implementation, as an embodiment, the network device may further include an output device (not shown in the figure) and an input device (not shown in the figure). The output device communicates with the processor 201, and may display information in a plurality of manners. For example, the output device may be a liquid crystal display (LCD), a light emitting diode (LED) display device, a cathode ray tube (CRT) display device, a projector, or the like. The input device communicates with the processor 201, and may receive input from a user in a plurality of manners. For example, the input device may be a mouse, a keyboard, a touchscreen device, or a sensing device.

The memory 203 is configured to store a program code that is used to perform the solutions of this application, and the execution is controlled by the processor 201. The processor 201 is configured to perform the program code (not shown in the figure) stored in the memory 203. The program code may include one or more software modules. The primary transmitter or the secondary transmitter shown in FIG. 1 may send a signal by using the processor 201 and the one or more software modules in the program code in the memory 203.

It can be learned, based on the foregoing description of the implementation environment of this embodiment of this application, that there may be a plurality of primary transmitters, each primary transmitter is corresponding to at least one secondary transmitter, and each primary transmitter and the at least one corresponding secondary transmitter may form a transmitter group, to jointly send signals to a plurality of receivers. In the following, an example that one primary transmitter is corresponding to one secondary transmitter is used to describe in detail the signal sending method provided in this embodiment of this application. When one primary transmitter is corresponding to a plurality of secondary transmitters, each of the plurality of secondary transmitters may perform processing based on a related operation of the secondary transmitter described in the following embodiments.

Figure 3:
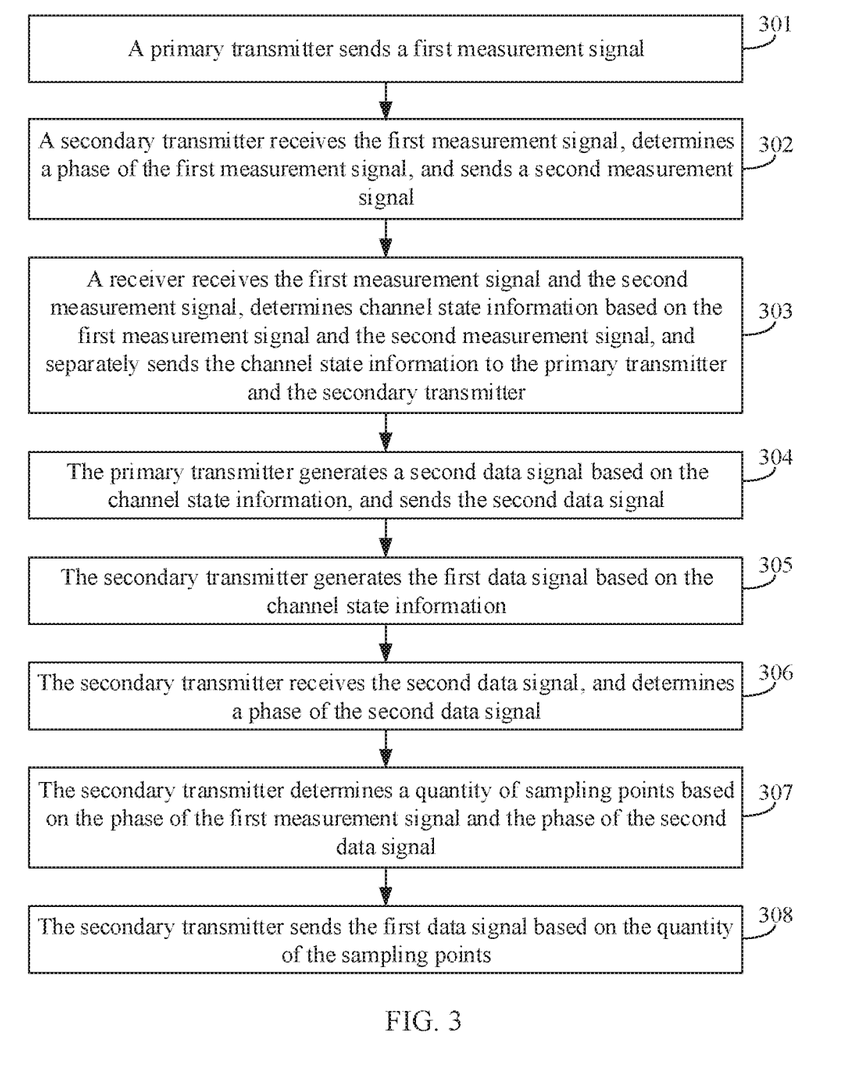
FIG. 3 is a flowchart of a signal sending method according to an embodiment of this application.

FIG. 3 is a flowchart of a signal sending method according to an embodiment of this application. The method may be applied to the implementation environment shown in FIG. 1. Referring to FIG. 3, the method includes the following steps.

301: A primary transmitter sends a first measurement signal.

In this embodiment of this application, before sending a data signal, the primary transmitter may first measure a channel between the primary transmitter and a receiver by sending a measurement signal. The first measurement signal may be a channel measurement frame, and the channel measurement frame may be negotiated by the primary transmitter with a secondary transmitter in advance.

Optionally, in this embodiment of this application, since the primary transmitter and the secondary transmitter need to jointly send data to the receiver, before sending a data signal, the secondary transmitter may also measure a channel between the secondary transmitter and the receiver by sending a measurement signal. The measurement signal sent from the secondary transmitter may also be a channel measurement frame. Based on this, to ensure that subsequently, the channel measurement frame of the secondary transmitter and the channel measurement frame of the primary transmitter can be aligned and sent, the primary transmitter may further send a first joint-transmission notification frame to the secondary transmitter and the receiver before sending the first measurement signal. The first joint-transmission notification frame carries a transmitter group identifier, and the transmitter group identifier may be used to identify a transmitter group to which the primary transmitter belongs. By using the transmitter group identifier carried in the first joint-transmission notification frame, the primary transmitter may instruct the secondary transmitter that belongs to the same transmitter group as the primary transmitter to receive the first measurement signal and perform channel measurement with the primary transmitter.

It should be noted that the first joint-transmission notification frame not only carries the transmitter group identifier, but also carries a device identifier of the receiver that receives to-be-sent data of the primary transmitter. By using the device identifier of the receiver carried in the first joint-transmission notification frame, the primary transmitter may instruct the receiver identified by the device identifier, to receive the first measurement signal and the second measurement signal sent by the secondary transmitter, so as to determine, based on the first measurement signal and the second measurement signal, channel state information used to represent a characteristic of a channel between the primary transmitter and the receiver and a characteristic of a channel between the secondary transmitter and the receiver.

After sending the first joint-transmission notification frame, the primary transmitter may send the first measurement signal after waiting for fixed duration from a time point at which the sending is completed. The fixed duration may be a short inter frame space (SIFS); or the fixed duration may be preset duration, for example, 10 microseconds or 15 microseconds.

302: The secondary transmitter receives the first measurement signal, determines a phase of the first measurement signal, and sends a second measurement signal.

In this embodiment of this application, the secondary transmitter may listen to, over an air interface, the first measurement signal sent by the primary transmitter. Specifically, when the first measurement signal is a channel measurement frame, if the secondary transmitter receives a physical frame synchronization header of the channel measurement frame, the secondary transmitter may measure and store the phase of the first measurement signal.

It should be noted that, when the secondary transmitter listens to, over the air interface, the first measurement signal sent by the primary transmitter, the secondary transmitter determines that a random detection delay between a time point of the physical frame synchronization header of the first measurement signal and a real time point of arrival of the physical frame synchronization header of the first measurement signal is detected. The detection delay results in a specific phase offset between the first measurement signal received by the secondary transmitter and the first measurement signal sent by the primary transmitter. Based on this, when the physical frame synchronization header of the channel measurement frame is detected by the secondary transmitter, the phase of the first measurement signal may be measured and recorded. The measured phase of the first measurement signal actually represents the phase offset of the first measurement signal within the detection delay, and may also be used to represent the detection delay from sending the first measurement signal by the primary transmitter to receiving the first measurement signal by the secondary transmitter.

After receiving the first measurement signal, the secondary transmitter may send the second measurement signal to the receiver. The second measurement signal may also be a channel measurement frame, and the second measurement signal may be used to measure the channel between the secondary transmitter and the receiver. When receiving the physical frame synchronization header of the first measurement signal, the secondary transmitter may determine, based on the time point of the physical frame synchronization header of the first measurement signal, a time point of a frame body at which the first measurement signal is received, and then send the second measurement signal at the time point of the frame body at which the first measurement signal is received. Within duration between the time point at which the synchronization frame header of the first measurement signal is received and the time point of the frame body at which the first measurement signal is received, the secondary transmitter may perform receiving and sending conversion. In addition, when the determined time point of the frame body for receiving the first measurement signal arrives, the second measurement signal sent by the secondary transmitter may be a frame body of a channel measurement frame excluding a frame header.

For example, it is assumed that the primary transmitter sends the first measurement signal at a time point $t_0$, and the secondary transmitter receives the physical frame synchronization header of the first measurement signal at a time point $t_0+\Delta\tau$, a specific phase offset occurs in the first measurement signal within $\Delta\tau$. Based on this, when the secondary transmitter receives the physical frame synchronization header of the first measurement signal, the phase of the first measurement signal may be recorded. At this point, the phase of the first measurement signal may be used to represent the phase offset of the first measurement signal within $\Delta\tau$, namely, may be used to represent the detection delay $\Delta\tau$. The secondary transmitter may determine, based on the time point $t_0+\Delta\tau$, a time point of arrival $t_0+\Delta\tau+t_d$ of the frame body of the first measurement signal, and send, at the time point of arrival $t_0+\Delta\tau+t_d$ of the frame body of the first measurement signal, the second measurement signal including the frame body. Within $t_d$, the secondary transmitter may perform the receiving and sending conversion.

It should be noted that, it can be learned based on the description in step 301 that, before sending the first measurement signal, the primary transmitter may further send, to the secondary transmitter, a first joint-transmission notification frame used to notify the secondary transmitter to receive the first measurement signal. Based on this, before receiving the first measurement signal, if the secondary transmitter receives the first joint-transmission notification frame, the secondary transmitter may detect whether the transmitter group identifier carries in the first joint-transmission notification frame is a transmitter group identifier to which the secondary transmitter belongs, so as to detect whether the first joint-transmission notification frame is used to notify the secondary transmitter. The secondary transmitter may store the transmitter group identifier to which the secondary transmitter belongs.

Specifically, the secondary transmitter may compare whether the transmitter group identifier carried in the first joint-transmission notification frame is the same as the transmitter group identifier stored in the secondary transmitter, and if the transmitter group identifier is the same the transmitter group identifier stored in the secondary transmitter, it indicates that the channel measurement is to be performed by the primary transmitter in the transmitter group to which the secondary transmitter belongs. Therefore, the secondary transmitter may generate the second measurement signal, and prepare to detect the first measurement signal sent by the primary transmitter, so that when the physical frame synchronization header of the first measurement signal is detected, the time point at which the frame body of the first measurement signal arrives is determined based on the time point at which the physical frame synchronization header of the first measurement signal arrives, and further the second measurement signal is sent at the determined time point at which the frame body of the first measurement signal arrives, completing the channel measurement with the primary transmitter.

303: The receiver receives the first measurement signal and the second measurement signal, determines the channel state information based on the first measurement signal and the second measurement signal, and separately sends the channel state information to the primary transmitter and the secondary transmitter.

The receiver may receive the first measurement signal sent by the primary transmitter and the second measurement signal sent by the secondary transmitter. Then the receiver may determine a status parameter of the channel between the receiver and the primary transmitter and a status parameter of the channel between the receiver and the secondary transmitter based on the first measurement signal and the second measurement signal. Then the receiver may combine the determined status parameters of the two channels to obtain the channel state information, and send the channel state information to the primary transmitter and the secondary transmitter separately. The channel state information includes the status parameter of the channel between the primary transmitter and the receiver and the status parameter of the channel between the secondary transmitter and the receiver; therefore, the channel state information may be used to represent the characteristic of the channel between the primary transmitter and the receiver and the characteristic of the channel between the secondary transmitter and the receiver.

Specifically, in this embodiment of this application, the receiver may combine the status parameters of the two channels to obtain a channel matrix, namely, the channel state information may be represented by the channel matrix. Alternatively, the receiver may combine the status parameters of the two channels into one array, and in this case, the channel state information may be represented by the array. Certainly, the channel state information may alternatively be represented in another form. This is not specifically limited in this embodiment of this application.

Optionally, it can be learned based on the foregoing description in 301 that, before sending the first measurement signal, the primary transmitter may further send the first joint-transmission notification frame to notify the secondary transmitter and the receiver. Based on this, before receiving the first measurement signal, if the receiver receives the first joint-transmission notification frame, the receiver may detect whether the first joint-transmission notification frame carries the device identifier of the receiver. If the first joint-transmission notification frame carries the device identifier of the receiver, it indicates that the channel measurement needs to be performed subsequently. At this point, the receiver may prepare to receive the measurement signal. The primary transmitter sends the first measurement signal after the fixed duration starting from the time point at which the first joint-transmission notification frame is sent. In addition, after detecting the physical frame synchronization header of the first measurement signal, the secondary transmitter also immediately sends the second measurement signal at the time point of arrival of the frame body of the first measurement signal. Therefore, after receiving the first joint-transmission notification frame, the receiver may prepare to receive the measurement signal that subsequently arrives, so as to determine, based on the measurement signal that subsequently arrives, the status parameter of the channel between the receiver and the device that sends the measurement signal.

304: The primary transmitter generates a second data signal based on the channel state information, and sends the second data signal.

The primary transmitter may receive the channel state information sent by the receiver, and determine a precoding matrix based on the channel state information. Then the primary transmitter may encode the to-be-sent data based on the determined precoding matrix, to obtain the second data signal, and send the second data signal to the secondary transmitter and the receiver.

Specifically, zero-forcing precoding is used as an example. Assuming that the channel state information is a channel matrix H, the primary transmitter may determine, based on the channel matrix, that a precoding matrix $W=H^{-1}$ is obtained, and then the primary transmitter may encode to-be-sent data $s_1$ based on the precoding matrix, to generate a second data signal $x_1=W \cdot s_1$.

Optionally, in this embodiment of this application, before sending the second data signal, the primary transmitter may further send a second joint-transmission notification frame to the secondary transmitter and the receiver. The second joint-transmission notification frame may carry a transmitter group identifier of a transmitter group to which the primary transmitter belongs and a device identifier of the receiver.

The transmitter group identifier may be used to: when receiving the second data signal sent by the primary transmitter, instruct the secondary transmitter that belongs to the same transmitter group as the primary transmitter to jointly send a data signal with the primary transmitter. The device identifier of the receiver may be used to instruct the receiver to receive a data signal that arrives after the second joint-transmission notification frame.

305: The secondary transmitter generates a first data signal based on the channel state information.

The secondary transmitter may receive the channel state information sent by the receiver, and determine a precoding matrix based on the channel state information. Then the secondary transmitter may encode the to-be-sent data based on the determined precoding matrix, to obtain the first data signal, and send the first data signal to the receiver.

Specifically, zero-forcing precoding is used as an example. Assuming that the channel state information is a channel matrix H, the secondary transmitter may determine, based on the channel matrix, that a precoding matrix $W=H^{-1}$ is obtained, and then the secondary transmitter may encode to-be-sent data $s_2$ based on the precoding matrix, to generate a first data signal $x_2=W \cdot s_2$.

It should be noted that the channel state information is determined by the receiver based on the first measurement signal and the second measurement signal, namely, the channel state information includes an impact made by a detection delay generated when the secondary transmitter detects the first measurement signal. Based on this, the primary transmitter and the secondary transmitter separately encode the to-be-sent data based on the channel state information, and the generated first data signal and second data signal actually also include the impact made by the detection delay of the first measurement signal.

306: The secondary transmitter receives the second data signal, and determines a phase of the second data signal.

In this embodiment of this application, the secondary transmitter may listen to, over an air interface, the second data signal sent by the primary transmitter. Specifically, when the second data signal is a data frame, if a frame header of the data frame is detected by the secondary transmitter over the air interface, the phase of the second data signal may be measured.

It should be noted that, when the secondary transmitter listens to, over the air interface, a physical frame synchronization header of the second data signal sent by the primary transmitter, there is also a random detection delay. The detection delay also causes a specific phase offset of the second data signal. In addition, since the detection delay includes some random errors, the detection delay may not be the same as the detection delay of the first measurement signal. That is, the phase offset of the second data signal caused by the detection delay of the second data signal may not be the same as the phase offset of the first measurement signal caused by the detection delay of the first measurement signal. When detecting the physical frame synchronization header of the second data signal, the secondary transmitter may measure and store the phase of the second data signal. At this point, the phase of the second data signal may actually represent the phase offset of the second data signal within the detection delay corresponding to the second data signal. In addition, the phase of the second data signal may be used to represent the detected detection delay of the physical frame synchronization header of the second data signal when the secondary transmitter listens to the second data signal over the air interface.

Optionally, it can be learned based on the description in 304 that, before sending the second data signal, the primary transmitter may send the second joint-transmission notification frame. Based on this, if the secondary transmitter receives the second joint-transmission notification frame, the secondary transmitter may detect whether the second joint-transmission notification frame carries the transmitter group identifier of the transmitter group to which the secondary transmitter belongs. If the second joint-transmission notification frame carries the transmitter group identifier of the transmitter group to which the secondary transmitter belongs, it indicates that the primary transmitter that belongs to the same transmitter group as the secondary transmitter is to send a data signal afterwards. At this point, the secondary transmitter may prepare to receive the second data signal that subsequently arrives, so as to determine, based on the phase of the second data signal, the time point at which the first data signal is sent. In this way, the secondary transmitter and the primary transmitter jointly send the data signal.

Optionally, in a possible implementation, step 306 may also be performed when the secondary transmitter receives the second joint-transmission notification frame and determines that the second joint-transmission notification frame carries the transmitter group identifier of the transmitter group to which the secondary transmitter belongs. That is, when detecting that the second joint-transmission notification frame carries the transmitter group identifier of the transmitter group to which the secondary transmitter belongs, the secondary transmitter may generate the first data signal, so that the secondary transmitter and the primary transmitter may jointly send the first data signal based on the phase of the second data signal when receiving the second data signal.

307: The secondary transmitter determines a quantity of time intervals based on the phase of the first measurement signal and the phase of the second data signal.

After the phase of the second data signal is determined, since the second data signal is generated based on the channel state information, and the channel state information actually includes the detection delay of the first measurement signal, the secondary transmitter may determine the phase difference between the phase of the second data signal and the phase of the first measurement signal. The phase difference may be used to represent the delay difference between the detection delay of the second data signal and the detection delay of the first measurement signal. Based on that the second data signal already includes the detection delay of the first measurement signal, when the first data signal is subsequently sent, since the first data signal also already includes the detection delay of the first measurement signal, only the difference between the detection delay of the second data signal and the detection delay of the first measurement signal, that is, the foregoing delay difference, needs to be compensated, so that the first data signal and the second data signal can be synchronized. In other words, in this embodiment of this application, the delay difference between the detection delay of the second data signal and the detection delay of the first measurement signal is actually the delay between the first data signal and the second data signal.

The secondary transmitter may convert the phase difference between the phase of the second data signal and the phase of the first measurement signal into the quantity of signal sampling time intervals, and the quantity of time intervals is used to represent the delay between the first data signal and the second data signal.

Specifically, the secondary transmitter may obtain a current signal sampling time, and determine the quantity of time intervals based on the time interval and the phase difference between the phase of the second data signal and the phase of the first measurement signal by using the following formula:

$$n = \text{round}\left(\frac{\Delta\alpha}{2\pi\Delta f \cdot T}\right),$$

where n is the quantity of time intervals, $\Delta\alpha$ is the phase difference between the phase of the first measurement signal and the phase of the second data signal, T is the current signal sampling time interval, and $\Delta f$ is a subcarrier spacing, where the subcarrier is a carrier used to perform modulation to obtain the first measurement signal and the second data signal.

308: The secondary transmitter sends the first data signal based on the quantity of time intervals.

In this embodiment of this application, when receiving the physical frame synchronization header of the second data signal, the secondary transmitter may estimate a receiving time point of the frame body of the second data signal based on the receiving time point of the physical frame synchronization header of the second data signal. In addition, the phase difference between the phase of the second data signal and the phase of the first measurement signal may be positive or negative. When the phase difference is positive, the determined quantity of time intervals n is positive. In this case, from the estimated receiving time point of the frame body of the second data signal, the secondary transmitter may send the first data signal in advance by n signal sampling time intervals. If the phase difference is negative, the determined quantity of time intervals is also negative. In this case, from the estimated receiving time point of the frame body of the second data signal, the secondary transmitter may delay sending of the first data signal by n signal sampling time intervals.

In this embodiment of this application, before the data signals are sent, the primary transmitter may send the first measurement signal, and the secondary transmitter may send the second measurement signal when receiving the first measurement signal. Afterwards, when receiving the first measurement signal and the second measurement signal, the receiver may determine the channel state information based on the first measurement signal and the second measurement signal, and separately send the channel state information to the primary transmitter and the secondary transmitter. Since the channel state information includes the detection delay of the first measurement signal, both the second data signal generated by the primary transmitter based on the channel state information and the first data signal generated by the secondary transmitter based on the channel state information include the detection delay of the first measurement signal. In this way, when receiving the second data signal sent by the primary transmitter, the secondary transmitter only needs to compare the phase of the second data signal with the phase of the first measurement signal, to obtain the delay difference between the detection delay of the second data signal and the detection delay of the first measurement signal. Since the detection delay of the first measurement signal is already included in the first data signal and the second data signal, when the first data signal is sent, only the delay difference between the detection delay of the second data signal and the detection delay of the first measurement signal needs to be compensated to eliminate an impact of the detection delays of the first data signal and the second data signal. In this way, time synchronization between the first data signal and the second data signal is implemented. Compared with a related technology in which a phase of a data signal sent by a primary transmitter is directly used to adjust a phase of a data signal sent by a secondary transmitter, this embodiment of this application has higher resistance to measurement errors by adjusting the sending time point of the first data signal by using a relative phase difference.

The foregoing embodiments mainly describe how to implement time synchronization for data signals when the primary transmitter and the secondary transmitter jointly send the data signals. In a possible implementation, the primary transmitter and the secondary transmitter may implement time synchronization for the data signals in another manner different from the foregoing embodiments. In this case, the primary transmitter may use the method shown in FIG. 4 to implement frame alignment between the data frame sent by the primary transmitter and the data frame sent by the secondary transmitter.

Figure 4:
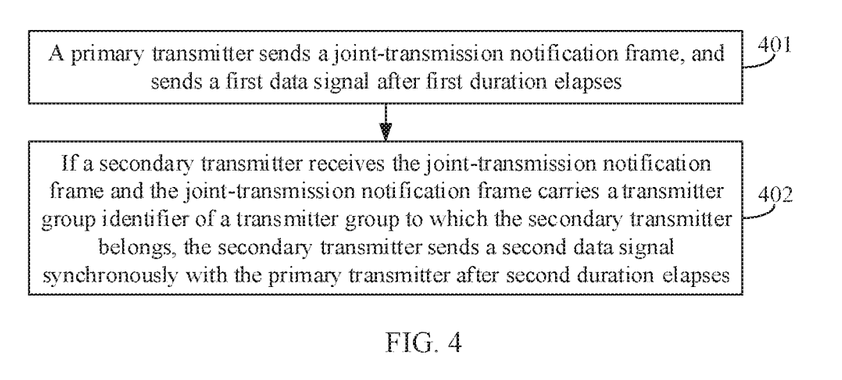
FIG. 4 is a flowchart of another signal sending method according to an embodiment of this application.

FIG. 4 is a flowchart of another signal sending method according to an embodiment of this application. The method may be applied to the implementation environment shown in FIG. 1, and the method includes the following steps.

401: A primary transmitter sends a joint-transmission notification frame, and sends a first data signal after first duration elapses.

In this embodiment of this application, before sending the data signal, the primary transmitter may first send the joint-transmission notification frame. The joint-transmission notification frame may carry a transmitter group identifier of a transmitter group to which the primary transmitter belongs. By using the joint-transmission notification frame that carries the transmitter group identifier, the primary transmitter may instruct a secondary transmitter that belongs to a same transmitter group as the primary transmitter to send the data signal synchronously with the primary transmitter.

Optionally, the joint-transmission notification frame may further carry a device identifier of a receiver. By using the device identifier, the primary transmitter may instruct the receiver identified by the device identifier to receive the data signal synchronously sent by the primary transmitter and the secondary transmitter.

After sending the joint-transmission notification frame, the primary transmitter may send the first data signal after the first duration elapses from a time point at which sending of the joint-transmission notification frame is completed. The first duration may be a short inter frame space (SIFS), or the first duration may be preset duration, for example, 10 microseconds or 15 microseconds. In addition, the first data signal is a signal obtained by encoding to-be-sent data by the primary transmitter.

402: If a secondary transmitter receives the joint-transmission notification frame and the joint-transmission notification frame carries a transmitter group identifier of a transmitter group to which the secondary transmitter belongs, the secondary transmitter sends a second data signal synchronously with the primary transmitter after second duration elapses.

The secondary transmitter may listen to, over an air interface, the signal sent by the primary transmitter. When receiving the joint-transmission notification frame sent by the primary transmitter, the secondary transmitter may detect whether the joint-transmission notification frame carries the transmitter group identifier of the transmitter group to which the secondary transmitter belongs. If the joint-transmission notification frame carries the transmitter group identifier of the transmitter group to which the secondary transmitter belongs, it indicates that the primary transmitter that belongs to the same transmitter group as the secondary transmitter is to send the first data signal afterwards, and the secondary transmitter needs to send the second data signal synchronously with the primary transmitter. Based on this, the secondary transmitter may encode the to-be-sent data to generate the second data signal, and send the second data signal after the second duration elapses from the time point at which a frame trailer of the joint-transmission notification frame is received. The second duration may be a short inter frame space (SIFS), or the second duration may be preset duration, for example, 10 microseconds or 15 microseconds. In addition, the second duration may be the same as the first duration, or different from the first duration.

In this embodiment of this application, before sending the first data signal, the primary transmitter may first send a joint-transmission notification frame to instruct the secondary transmitter that belongs to the same transmitter group as the primary transmitter to send the data signal synchronously with the secondary transmitter. That is, in this embodiment of this application, the primary transmitter may select a transmitter by using the joint-transmission notification frame. After completing the sending of the joint-transmission notification frame, the primary transmitter may send the data signal after specific duration elapses, and the secondary transmitter also sends the second data signal after specific duration elapses from the time point at which the frame trailer of the joint-transmission notification frame that carries the transmitter group identifier of the transmitter group to which the secondary transmitter belongs is received. In this way, the joint transmission time of the primary transmitter and the secondary transmitter is aligned.

The foregoing describes the signal sending methods provided in the embodiments of this application. The following describes apparatuses that perform the foregoing methods.

Figure 5:
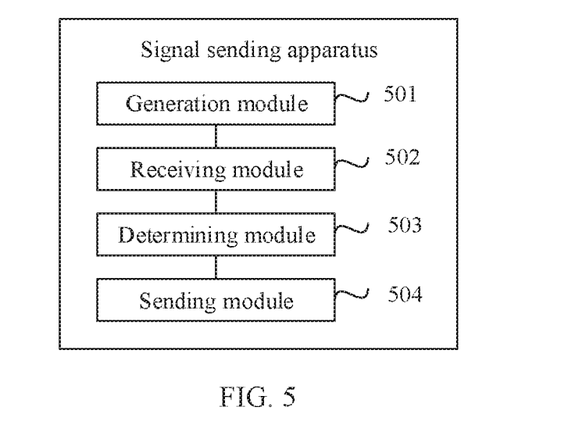
FIG. 5 is a schematic structural diagram of a signal sending apparatus according to an embodiment of this application.

Referring to FIG. 5, an embodiment of this application provides a signal sending apparatus. The apparatus may be the secondary transmitter in the foregoing embodiments. The apparatus includes:

a generation module 501, configured to generate a first data signal based on channel state information, where the channel state information is used to represent a characteristic of a channel between a primary transmitter and a receiver and a characteristic of a channel between a secondary transmitter and the receiver;

a receiving module 502, configured to receive a second data signal sent by the primary transmitter, and determine a phase of the second data signal; and a sending module 503, configured to send the first data signal based on a phase of a first measurement signal sent by the primary transmitter and the phase of the second data signal sent by the primary transmitter.

Optionally, the receiving module 502 is further configured to receive the first measurement signal sent by the primary transmitter, and determine the phase of the first measurement signal;

the sending module 503 is further configured to send a second measurement signal to the receiver; and the receiving module 502 is further configured to receive the channel state information determined by the receiver based on the first measurement signal and the second measurement signal.

Optionally, the apparatus further includes a triggering module (not shown in the figure).

The receiving module 502 is further configured to receive a first joint-transmission notification frame sent by the primary transmitter, where the first joint-transmission notification frame carries a transmitter group identifier, and the transmitter group identifier is used to identify a transmitter group to which the primary transmitter belongs; and the triggering module is configured to: if the transmitter group identifier carried by the first joint-transmission notification frame is the same as a stored transmitter group identifier, after first duration elapses from a time point at which reception of the first joint-transmission notification frame ends, trigger the receiving module to receive the first measurement signal sent by the primary transmitter.

Optionally, the receiving module 502 is further configured to receive a second joint-transmission notification frame sent by the primary transmitter, where the second joint-transmission notification frame carries a transmitter group identifier, and the transmitter group identifier is used to identify a transmitter group to which the primary transmitter belongs; and the triggering module is further configured to: if the transmitter group identifier carried by the second joint-transmission notification frame is the same as a stored transmitter group identifier, after second duration elapses from a time point at which reception of the second joint-transmission notification frame ends, trigger the receiving module to receive the second data signal sent by the primary transmitter.

Optionally, the sending module 503 is specifically configured to:

obtain a current signal sampling time interval;

determine a phase difference between the phase of the second data signal and the phase of the first measurement signal;

determine a quantity of time intervals based on the signal sampling time interval and the phase difference; and send the first data signal based on the quantity of time intervals.

In summary, in this embodiment of this application, since the channel state information includes the detection delay of the first measurement signal, both the second data signal generated by the primary transmitter based on the channel state information and the first data signal generated by the secondary transmitter based on the channel state information include the detection delay of the first measurement signal. In this way, when receiving the second data signal sent by the primary transmitter, the secondary transmitter only needs to compare the phase of the second data signal with the phase of the first measurement signal, to obtain the delay difference between the detection delay of the second data signal and the detection delay of the first measurement signal. Since the detection delay of the first measurement signal is already included in the first data signal and the second data signal, when the first data signal is sent, only the delay difference between the detection delay of the second data signal and the detection delay of the first measurement signal needs to be compensated to eliminate an impact of the detection delays of the first data signal and the second data signal. In this way, time synchronization between the first data signal and the second data signal is implemented. Compared with a related technology in which a phase of a data signal sent by a primary transmitter is directly used to adjust a phase of a data signal sent by a secondary transmitter, this embodiment of this application has higher resistance to measurement errors by adjusting the sending time point of the first data signal by using a relative phase difference.

Figure 6:
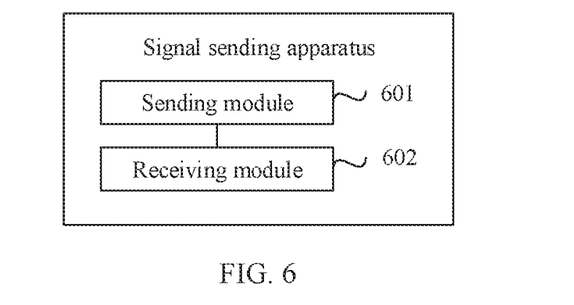
FIG. 6 is a schematic structural diagram of another signal sending apparatus according to an embodiment of this application.

Referring to FIG. 6, an embodiment of this application provides a signal sending apparatus. The apparatus may be the primary transmitter in the foregoing embodiments, and the apparatus includes:

a sending module 601, configured to send a first measurement signal to a secondary transmitter, so that the secondary transmitter sends a second measurement signal based on the first measurement signal; and a receiving module 602, configured to receive channel state information determined by a receiver based on the first measurement signal and the second measurement signal, and generate a second data signal based on the channel state information, where the channel state information is used to represent a characteristic of a channel between the primary transmitter and the receiver and a characteristic of a channel between the secondary transmitter and the receiver.

The sending module 601 is further configured to send the second data signal.

Optionally, the sending module 601 is further configured to:

send a first joint-transmission notification frame to the secondary transmitter, where the first joint-transmission notification frame carries a transmitter group identifier, and the transmitter group identifier is used to identify a transmitter group to which the primary transmitter belongs.

Optionally, the sending module 601 is further configured to:

send a second joint-transmission notification frame to the secondary transmitter, where the second joint-transmission notification frame carries a transmitter group identifier, and the transmitter group identifier is used to identify a transmitter group to which the primary transmitter belongs.

In this embodiment of this application, the primary transmitter may select, by sending the second joint-transmission notification frame that carries the transmitter group identifier, the secondary transmitter that sends the data signal jointly with the primary transmitter, and instruct the secondary transmitter to prepare to receive the data signal sent by the primary transmitter, so that the secondary transmitter sends the data signal jointly with the primary transmitter when receiving the data signal sent by the primary transmitter.

It should be noted that, when the signal sending apparatus provided in the foregoing embodiments sends a signal, division into the foregoing function modules is merely used as an example for description. In actual application, the foregoing functions may be allocated to different function modules as required for implementation. To be specific, an internal structure of the device is divided into different function modules, to complete all or some of the functions described above. In addition, the signal sending apparatus provided in the foregoing embodiments and the signal sending method embodiments belong to the same concept. For a specific implementation process of the signal sending apparatus, refer to the method embodiments. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by using hardware or by program instructing related hardware. The program may be stored in a computer-readable storage medium. The storage medium may include: a read-only memory, a magnetic disk, or a compact disc.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A signal sending method, wherein the method comprises:

generating a first data signal based on channel state information, wherein the channel state information is used to represent a characteristic of a channel between a primary transmitter and a receiver and a characteristic of a channel between a secondary transmitter and the receiver;

receiving a second data signal sent by the primary transmitter;

determining a phase of the second data signal sent by the primary transmitter; and sending the first data signal based on a phase of a first measurement signal sent by the primary transmitter and the phase of the second data signal sent by the primary transmitter.

2. The method according to claim 1, wherein before the generating a first data signal based on channel state information, the method further comprises:

receiving the first measurement signal sent by the primary transmitter;

determining the phase of the first measurement signal sent by the primary transmitter;

sending a second measurement signal to the receiver; and receiving the channel state information determined by the receiver based on the first measurement signal and the second measurement signal.

3. The method according to claim 2, wherein before the receiving the first measurement signal sent by the primary transmitter, the method further comprises:

receiving a first joint-transmission notification frame sent by the primary transmitter, wherein the first joint-transmission notification frame carries a transmitter group identifier, and wherein the transmitter group identifier is used to identify a transmitter group to which the primary transmitter belongs; and if the transmitter group identifier carried by the first joint-transmission notification frame is the same as a stored transmitter group identifier, after first duration elapses from a time point at which reception of the first joint-transmission notification frame ends, performing the step of receiving the first measurement signal sent by the primary transmitter.

4. The method according to claim 1, wherein before the receiving a second data signal sent by the primary transmitter, the method further comprises:

receiving a second joint-transmission notification frame sent by the primary transmitter, wherein the second joint-transmission notification frame carries a transmitter group identifier, and wherein the transmitter group identifier is used to identify a transmitter group to which the primary transmitter belongs; and if the transmitter group identifier carried by the second joint-transmission notification frame is the same as a stored transmitter group identifier, after second duration elapses from a time point at which reception of the second joint-transmission notification frame ends, performing the step of receiving the second data signal sent by the primary transmitter.

5. The method according to claim 1, wherein the sending the first data signal based on a phase of a first measurement signal sent by the primary transmitter and the phase of the second data signal sent by the primary transmitter comprises:

obtaining a current signal sampling time interval;

determining a phase difference between the phase of the second data signal and the phase of the first measurement signal;

determining a quantity of time intervals based on the signal sampling time interval and the phase difference; and sending the first data signal based on the quantity of time intervals.

6. A signal sending method, wherein the method comprises:

sending a first measurement signal to a secondary transmitter, wherein the secondary transmitter sends a second measurement signal based on the first measurement signal;

receiving channel state information determined by a receiver based on the first measurement signal and the second measurement signal;

generating a second data signal based on the channel state information, wherein the channel state information is used to represent a characteristic of a channel between a primary transmitter and the receiver and a characteristic of a channel between the secondary transmitter and the receiver; and sending the second data signal.

7. The method according to claim 6, wherein before the sending a first measurement signal to a secondary transmitter, the method further comprises:

sending a first joint-transmission notification frame to the secondary transmitter, wherein the first joint-transmission notification frame carries a transmitter group identifier, and wherein the transmitter group identifier is used to identify a transmitter group to which the primary transmitter belongs.

8. The method according to claim 6, wherein before the sending the second data signal, the method further comprises:

sending a second joint-transmission notification frame to the secondary transmitter, wherein the second joint-transmission notification frame carries a transmitter group identifier, and wherein the transmitter group identifier is used to identify a transmitter group to which the primary transmitter belongs.

9. A signal sending apparatus, wherein the apparatus comprises:

a receiver;

at least one processor, the at least one processor configured to generate a first data signal based on channel state information, wherein the channel state information is used to represent a characteristic of a channel between a primary transmitter and the receiver and a characteristic of a channel between a secondary transmitter and the receiver;

the receiver configured to receive a second data signal sent by the primary transmitter;

the at least one processor further configured to determine a phase of the second data signal; and a transmitter, the transmitter configured to send the first data signal based on a phase of a first measurement signal sent by the primary transmitter and the phase of the second data signal sent by the primary transmitter.

10. The apparatus according to claim 9, wherein:

the receiver is further configured to receive the first measurement signal sent by the primary transmitter;

the at least one processor further configured to determine the phase of the first measurement signal;

the transmitter is further configured to send a second measurement signal to the receiver; and the receiver is further configured to receive the channel state information based on the first measurement signal and the second measurement signal.

11. The apparatus according to claim 10, wherein:

the receiver is further configured to receive a first joint-transmission notification frame sent by the primary transmitter, wherein the first joint-transmission notification frame carries a transmitter group identifier, and wherein the transmitter group identifier is used to identify a transmitter group to which the primary transmitter belongs; and the at least one processor is configured to: if the transmitter group identifier carried by the first joint-transmission notification frame is the same as a stored transmitter group identifier, after first duration elapses from a time point at which reception of the first joint-transmission notification frame ends, trigger the receiver to receive the first measurement signal sent by the primary transmitter.

12. The apparatus according to claim 9, wherein:

the receiver is further configured to receive a second joint-transmission notification frame sent by the primary transmitter, wherein the second joint-transmission notification frame carries a transmitter group identifier, and wherein the transmitter group identifier is used to identify a transmitter group to which the primary transmitter belongs; and the at least on processor is further configured to: if the transmitter group identifier carried by the second joint-transmission notification frame is the same as a stored transmitter group identifier, after second duration elapses from a time point at which reception of the second joint-transmission notification frame ends, trigger the receiver to receive the second data signal sent by the primary transmitter.

13. The apparatus according to claim 9, wherein the transmitter is configured to:
    obtain a current signal sampling time interval;
    determine a phase difference between the phase of the second data signal and the phase of the first measurement signal;
    determine a quantity of time intervals based on the signal sampling time interval and the phase difference; and
    send the first data signal based on the quantity of time intervals.

* * * * *